US012655012B1

(12) United States Patent
Richardson

(10) Patent No.: US 12,655,012 B1
(45) Date of Patent: Jun. 16, 2026

(54) HANDLE FOR A CONCEALED WHIP SYSTEM

(71) Applicant: Donald G. Richardson, Henderson, NV (US)

(72) Inventor: Donald G. Richardson, Henderson, NV (US)

( * ) Notice: Subject to any disclaimer, the term of this patent is extended or adjusted under 35 U.S.C. 154(b) by 135 days.

(21) Appl. No.: 18/791,585

(22) Filed: Aug. 1, 2024

Related U.S. Application Data

(62) Division of application No. 17/993,663, filed on Nov. 23, 2022.

(60) Provisional application No. 63/350,648, filed on Jun. 9, 2022, provisional application No. 63/282,631, filed on Nov. 23, 2021.

(51) Int. Cl.
*B68B 11/00* (2006.01)
*A41F 9/00* (2006.01)
*A45F 5/02* (2006.01)

(52) U.S. Cl.
CPC .............. *B68B 11/00* (2013.01); *A41F 9/002* (2013.01); *A45F 5/021* (2013.01)

(58) Field of Classification Search
CPC ........................................................ B68B 11/00
USPC .................................................. 231/2.1, 5, 6
See application file for complete search history.

(56) References Cited

U.S. PATENT DOCUMENTS 1,666,201 A * 4/1928 Goldstein ................ A63B 5/20 16/442
2,233,764 A * 3/1941 Bauermeister ..... A63B 21/4047 482/127
3,451,675 A * 6/1969 Burzenski ............ A63B 21/045 482/126
3,713,580 A * 1/1973 Mickleson ............... H05C 1/06 231/7
4,527,720 A * 7/1985 Hayes ...................... A45F 5/021 224/679
5,284,458 A * 2/1994 Perry ................... A63B 21/169 482/121
5,947,352 A * 9/1999 Parsons ...................... A45F 5/00 224/250
6,692,415 B1 * 2/2004 Winston ............. A63B 21/0004 482/122
7,372,502 B2 * 5/2008 Gonzalez ............. G03B 17/561 224/908

(Continued)

FOREIGN PATENT DOCUMENTS

GB 2064342 A * 6/1981 ......... A63B 21/4035

*Primary Examiner* — Morgan T Jordan
(74) *Attorney, Agent, or Firm* — Bayramoglu Law Offices LLC

(57) ABSTRACT

A personal defense belt for encircling a waist of a person comprises an elongated flexible web, a buckle mechanism, a whip, and a handle. The personal defense belt further includes an elongated flexible cover fixed with the outside surface of the flexible web and extends along the flexible web to a terminating location. A width of the flexible cover is larger than a width of the flexible web, such that when the top and bottom edges of the flexible cover are fixed with the top and bottom edges of the flexible web, the flexible cover bows to form a whip storage space between the flexible cover and the flexible web. The whip is selectively stowable in the whip storage space, whereby the person May grasp the handle of the whip and pull the whip from the whip storage space to quickly brandish the whip.

7 Claims, 10 Drawing Sheets

(56) References Cited

U.S. PATENT DOCUMENTS

| | | | | | |
|---|---|---|---|---|---|
| 7,536,756 | B2 * | 5/2009 | McLoughlin | F16L 3/01 | 294/149 |
| 7,749,140 | B1 * | 7/2010 | Lindemeier | A63B 21/4035 | 482/126 |
| 7,914,426 | B1 * | 3/2011 | Lie | A63B 23/14 | 482/121 |
| 8,782,854 | B1 * | 7/2014 | Samuels | A63B 21/00043 | 482/126 |
| 9,581,414 | B1 * | 2/2017 | Mironski | F41C 33/046 | |
| 9,925,405 | B2 * | 3/2018 | Matthews | A63B 24/0062 | |
| D964,840 | S * | 9/2022 | Richardson | D22/117 | |
| 2003/0121946 | A1 * | 7/2003 | Tai | A41F 9/002 | 224/587 |
| 2005/0067449 | A1 * | 3/2005 | Jauvin | A63B 57/20 | 224/660 |
| 2007/0080201 | A1 * | 4/2007 | Wotring | B68B 11/00 | 231/2.1 |
| 2008/0230593 | A1 * | 9/2008 | Parow | B68B 11/00 | 231/2.1 |
| 2010/0011487 | A1 * | 1/2010 | Kim | A41F 9/002 | 2/311 |
| 2011/0269607 | A1 * | 11/2011 | Choi | A63B 21/4035 | 482/131 |
| 2012/0167353 | A1 * | 7/2012 | Geller | A45F 5/021 | 24/302 |
| 2014/0221178 | A1 * | 8/2014 | Wagner | A63B 21/00043 | 482/126 |
| 2014/0323271 | A1 * | 10/2014 | Hinds | A63B 21/4043 | 482/8 |
| 2015/0005143 | A1 * | 1/2015 | Liu | A63B 21/4035 | 482/129 |
| 2017/0340094 | A1 * | 11/2017 | Wells | A41F 9/002 | |
| 2020/0039053 | A1 * | 2/2020 | Reeves | B25G 1/102 | |
| 2020/0329850 | A1 * | 10/2020 | Haack | A45C 5/14 | |

* cited by examiner

HANDLE FOR A CONCEALED WHIP SYSTEM

CROSS REFERENCE TO RELATED APPLICATIONS

This application is a Divisional of U.S. Utility patent application Ser. No. 17/993,663, filed on Nov. 23, 2022, which claimed the benefit of US Provisional Patent Application 63/282,631, filed on Nov. 23, 2021, as well as U.S. Provisional Patent Application 63/350,648, filed on Jun. 9, 2022, all incorporated herein by reference.

STATEMENT REGARDING FEDERALLY SPONSORED RESEARCH AND DEVELOPMENT

Not Applicable.

FIELD OF THE INVENTION

This invention relates to personal protection devices, and more particularly to concealed belt whip.

BACKGROUND

Self-defense is a basic human right, and many self-defense tools have been devised to aid a person in perilous situations when facing an attacker. Firearms, while effective, are often lethal and can be defeated if the attacker is too close, and as such many people are hesitant to use or carry firearms. Firearms are also prone to malfunction if not properly maintained. Knives are likewise often lethal, and require the victim of an attack to be well within harm's way to be used effectively against the attacker. Pepper spray can be an effective attack deterrent, but can only be used a few times before being exhausted. All of these personal defense tools must be located on the person and quickly deployable to be effective.

A personal, portable whip concealed in one's belt has many advantages over the above-mentioned prior art. One potential drawback, however, is that the handle of such a device projects away from a whip portion of the portable whip, and causes shirts or jackets to visibly bulge. Likewise, when the whip is stored in a purse or carrying bag, the handle is not easily stored in a reachable position that is not also quite plainly visible.

Therefore, there is a need for a device that is non-lethal and effective at deterring an attacker. Such a needed device would not require regular upkeep or maintenance. The needed invention would further be simple to use, and would not require a person to approach too closely to their attacker. Such a needed device could be deployed in a concealed belt, purse, handbag, or the like and would have a pivoting handle that is easily concealed yet snaps into a proper position for use once deployed. The needed device would also be easy to brandish quickly, always be available at-hand in a convenient manner, and would be essentially concealed when not in use. The present invention accomplishes these objectives.

SUMMARY OF THE INVENTION

The present device comprises an elongated whip having a distal end and a proximal end. A handle for the whip includes a receiver that has an opening at a distal end of the receiver. The opening is adapted for receiving the proximal end of the whip therein. The receiver further includes a pivotable barrel at a proximal end of the receiver. The pivotable barrel has a bore therethrough from a top end thereof to a bottom end thereof.

A handle body has a barrel receiver formed in a distal end of the handle body. The barrel receiver is adapted for receiving the pivotable barrel rotatably therein. A pivot pin is adapted for fixing through the distal end of the handle body at a pivot pin aperture, and the bore of the pivotable barrel. As such the pivotal barrel is free to rotate within an angular range between where the receiver strikes the handle body on one side to the other.

Such a whip device preferably includes a belt with a pocket for sheathing the whip when not in use. The belt includes a buckle arrangement at a proximal end of the belt, and a distal end. When encircling a user's waist, it is desirable for concealment for the whip handle to lie flat against the belt and not bulge outwardly. The handle body can be pivoted with respect to the receiver so that the handle body lies flat against the belt. A hook-type fastener material can be fixed with the handle body to secure the handle body against a look-type fastener material fixed with the belt. When the user needs to brandish the whip, the handle body can be manually pulled away from the belt, pulling the whip out of the pocket, to brandish the whip.

The handle preferably further includes a pivot locking mechanism that includes a pin slot formed at the barrel receiver of the handle body. The pin slot is adapted for slidably retaining a locking pin therein, which is urged towards the pivotable barrel by a spring fixed within the pin slot. An actuator is fixed with the locking pin and projects through an actuator slot formed in the handle body. The locking pin normally projects through the barrel receiver and into a locking aperture formed in the pivotable barrel, unless the actuator and the locking pin are pulled away from the pivotable barrel manually against the spring, which allows the whip and the receiver to pivot within the barrel receiver of the handle body. As such, when the handle is pulled away from the belt, as the whip and the receiver rotate to align the locking aperture with the locking pin, the locking pin snaps into place in the locking aperture to rotationally fix the handle with the whip.

The present invention is a device that is non-lethal and effective at deterring an attacker. The present invention does not require regular upkeep or maintenance, is simple to use, and does not require a user to approach too closely to their attacker to be used effectively. The present invention is easy to brandish quickly, always available at-hand in a convenient manner, and is essentially concealed when not in use. The handle of such a whip is pivotable to allow the handle to lie flat on one's belt, handbag, purse, or the like. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Figure 1:
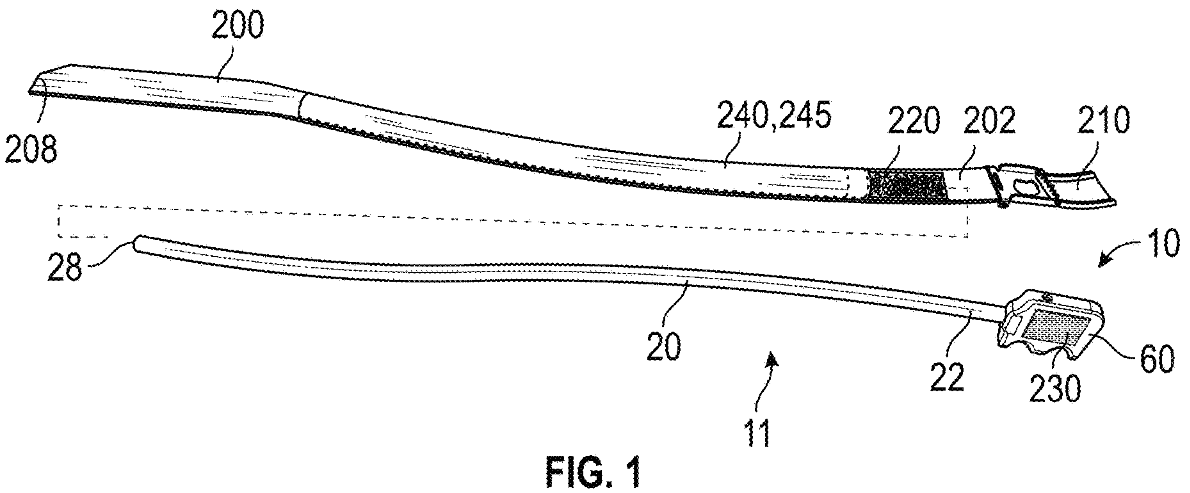
FIG. 1 is a perspective view of the invention.
Figure 2:
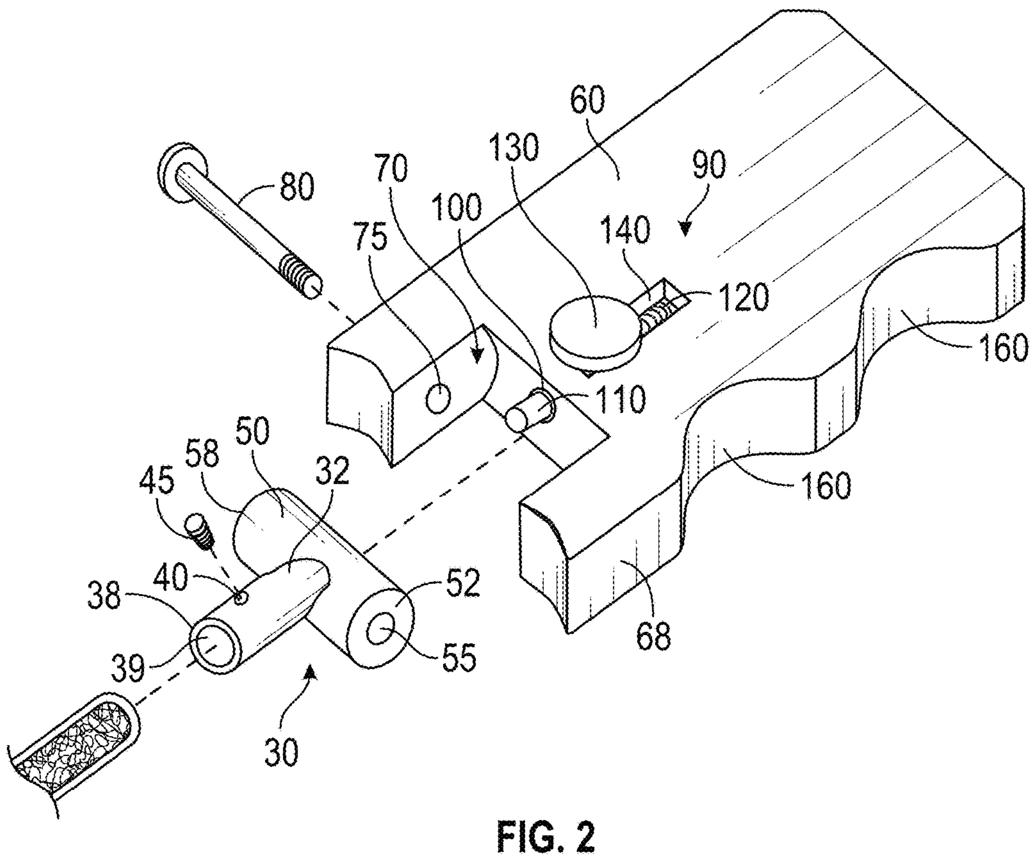
FIG. 2 is an exploded perspective view of a handle of the invention.
Figure 3:
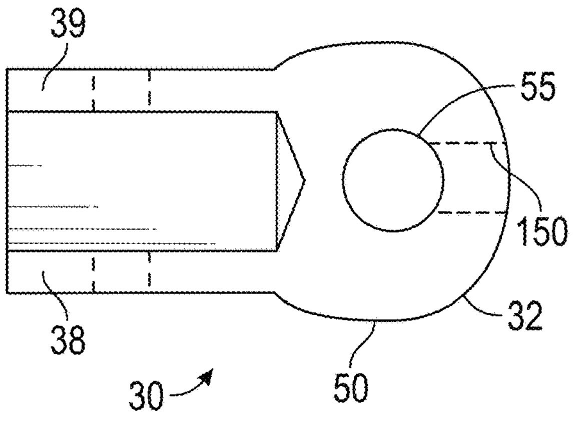
FIG. 3 is a top plan view of a whip receiver of the invention.
Figure 4:
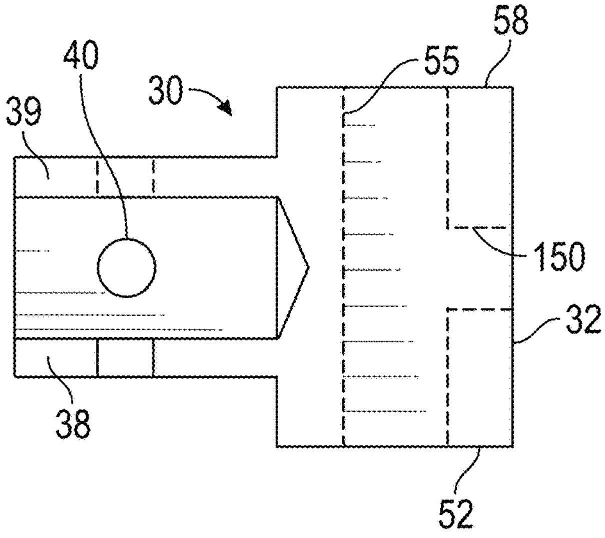
FIG. 4 is a side elevational view of the whip receiver.
Figure 5:
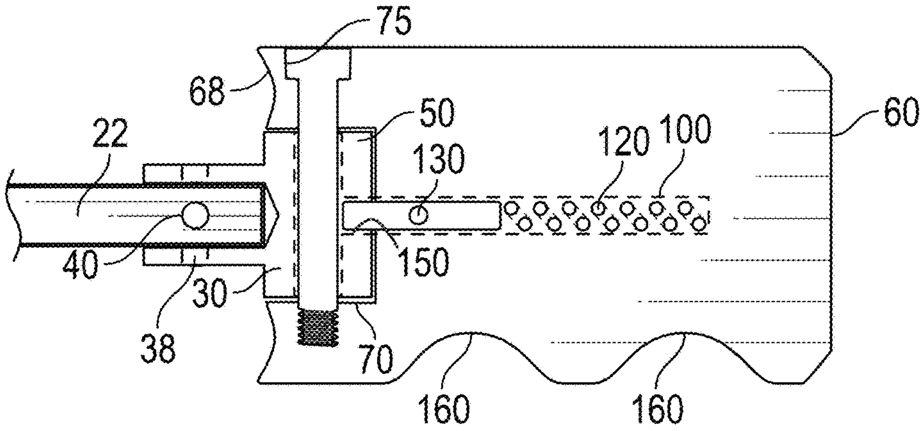
FIG. 5 is a cross-sectional view of the handle, taken along a vertical plane through a longitudinal axis of the handle.

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

FIGS. 1-5 illustrate a whip device 11 that comprises an elongated whip 20 having a distal end 28 and a proximal end 22. A handle 10 for the whip 20 includes a receiver 30 that has an opening 39 at a distal end 38 of the receiver 30. The opening 39 is adapted for receiving the proximal end 22 of the whip 20 therein. The distal end 38 of the receiver 30 has a transverse threaded set screw aperture 40 therethrough. A set screw 45 is adapted for being received in the threaded set screw aperture 40 and for tightening against the proximal end 22 of the whip 20 to secure the whip 20 in the receiver 30.

The receiver 30 further includes a pivotable barrel 50 at a proximal end 32 of the receiver 30. The pivotable barrel 50 has a bore 55 therethrough from a top end 58 thereof to a bottom end 52 thereof.

A handle body 60 has a barrel receiver 70 formed in a distal end 68 of the handle body 60. The barrel receiver 70 is adapted for receiving the pivotable barrel 50 rotatably therein. A pivot pin 80 is adapted for fixing through the distal end 68 of the handle body 60 at a pivot pin aperture 75, and the bore 55 of the pivotable barrel 50. As such the pivotal barrel 50 is free to rotate within an angular range between where the receiver 30 strikes the handle body 60 on one side to the other. Preferably the handle body 60 further includes two or more ergonomic finger grooves 160 to facilitate gripping of the handle body 60. Preferably the receiver 30 and the handle body 60 are made from a strong and rigid plastic or metallic material.

Figure 6:
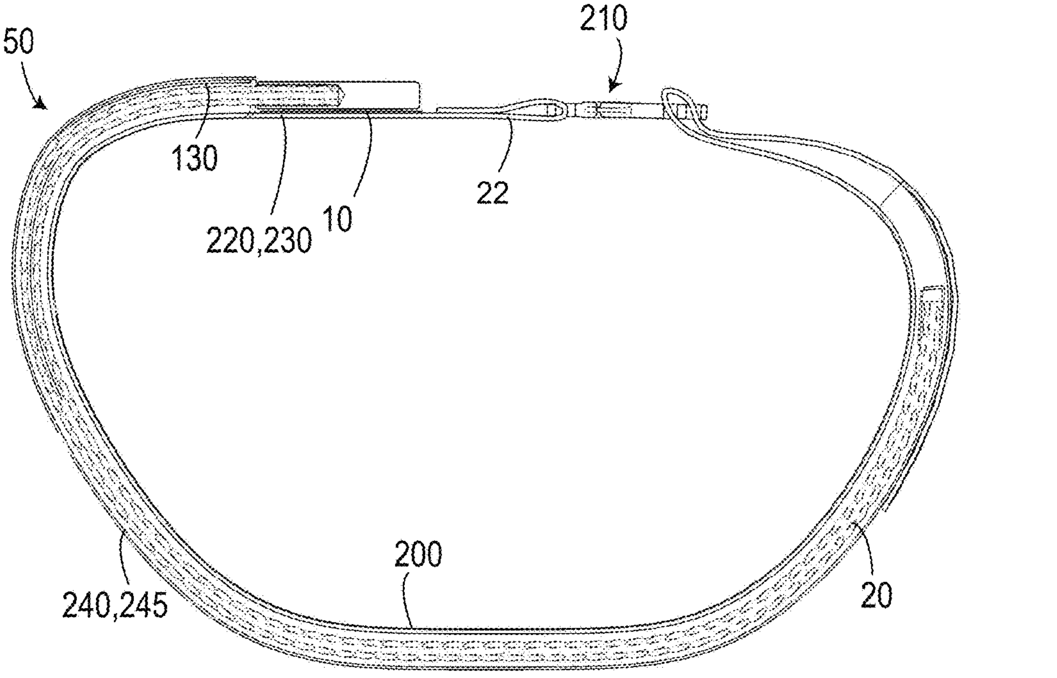
FIG. 6 is a diagram of a belt of the invention having a pocketing sheath or pocket, shown in cross-section for clarity of illustration.

Such a whip device 11, in one embodiment, includes a belt 200 (FIG. 6) with a sheath or pocket 240 for sheathing and concealing the whip 20 when not in use. The belt 200 includes a buckle arrangement 210 at a proximal end 202 of the belt 200, and a distal end 208. When encircling a waist 416 of a person 415 (FIGS. 11 and 12), it is desirable for concealment for the whip handle 10 to lie flat against the belt 200 and not bulge outwardly. The handle body 60 can be pivoted with respect to the receiver 30 so that the handle body 60 lies flat against the belt 200. A hook-type fastener material 230 can be fixed with the handle body 60 to secure the handle body 60 against a loop-type fastener material 220 fixed with the belt 200 (FIG. 1). When the user needs to brandish the whip 20, the handle body 60 can be manually pulled away from the belt 200, pulling the whip 20 out of the pocket 240, to brandish the whip 20. A Teflon® or other low-friction material can be fixed with an inside surface of the pocket 240 to facilitate removal of the whip 20 from the pocket 240. The pocket 240 may be made from a strip 245 of nylon webbing, or the like, sewn to the belt 200. In some embodiments the strip 245 of nylon webbing is made slightly wider than the belt so that the strip 245 puckers to form the pocket 240. However, nylon web is stretchable over time, so the strip 245 of material may be made substantially the same width as that of the belt 200, and with the whip 20 stored therebetween the strip 245 and the belt 200 will stretch to accommodate the whip 20 therebetween.

Figure 10:
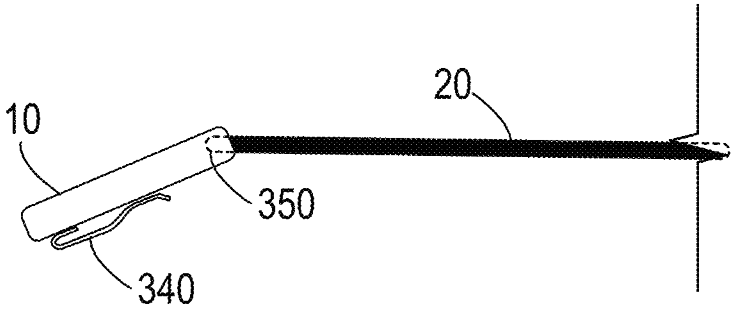
FIG. 10 is a partial side elevational view of an alternate embodiment of the handle.

In an alternate embodiment, illustrated in FIG. 10, the whip 20 is fixed within the handle 10 and the whip 20 is kinked or otherwise biased at an angle so that the handle 10 is angled with respect to the whip 20 at the proximal end 22 thereof. An angled aperture 350 may be formed in the handle 10, for example. As such, the handle 10 lies flat against the belt 200 when the whip 20 is concealed within the pocket 240.

Figure 7:
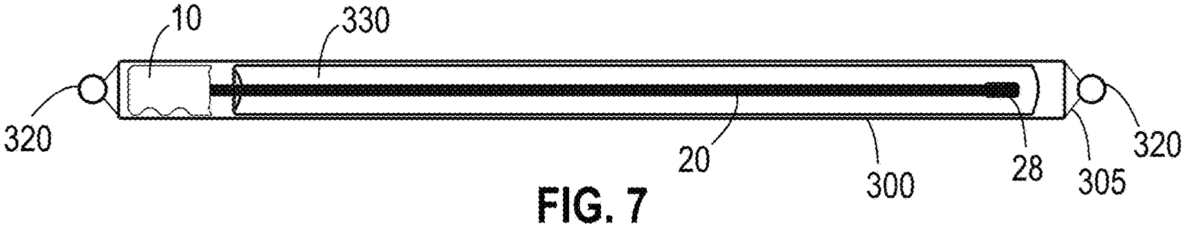
FIG. 7 is a top plan diagram of an alternate embodiment of the invention, illustrating a strap for a purse or handle, the strap having a pocket or sheath for concealing the whip therein, shown partially transparent for clarity of illustration.
Figure 8:
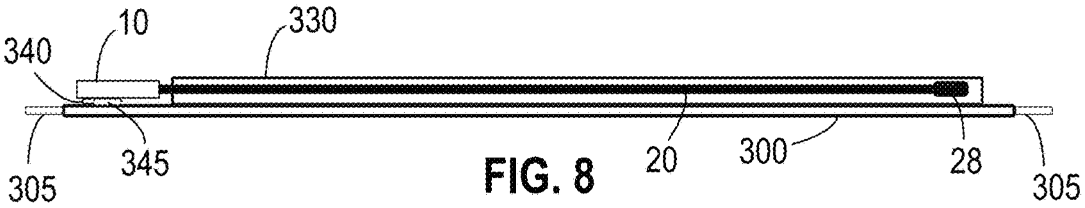
FIG. 8 is a side elevational diagram of the embodiment of FIG. 7.
Figure 9:
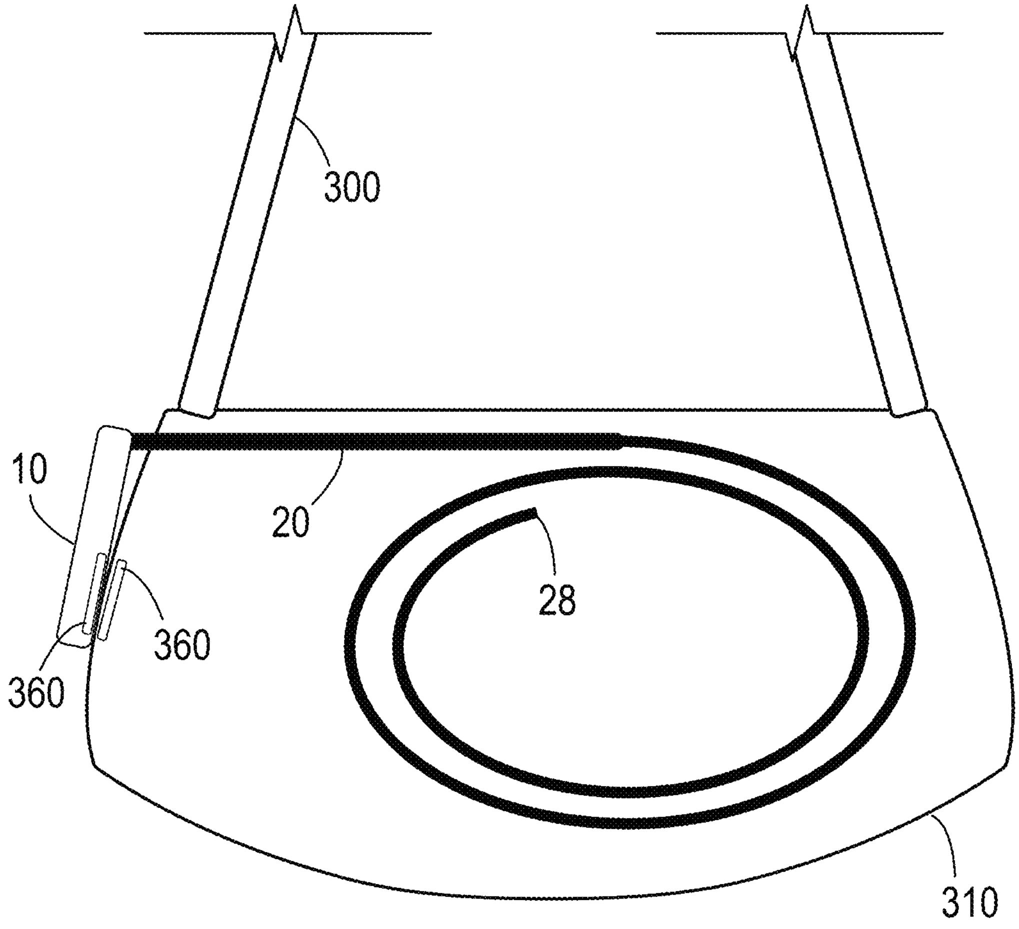
FIG. 9 is a front elevational diagram of an alternate embodiment of the invention, illustrating a purse shown partially transparent for clarity of illustration and having an internal compartment for concealing the whip, wherein the handle is secured to outside of the purse for facilitating deployment of the whip.

In an alternate embodiment of the invention, the whip device 11 includes a strap 300 (FIGS. 7 and 8) for a purse 310 or handbag. Opposing ends 305 of the strap 300 are adapted to connect with the purse 310, such as with rings 320, mechanical hooks (not shown), or other fastening mechanisms as is known in the art. The strap 30 includes a pocket 330 for receiving the whip 20 therein and substantially concealing the whip 20 from casual visual observation. In such an embodiment, preferably a spring clip 340 (FIGS. 8 and 10) is fixed with the handle 10 of the whip 20, the spring clip 340 being temporarily retained in a spring clip retaining strap 345 or loop fixed with the strap 300. Alternately the handle 10 may be selectively fixed with the strap 300 with a hook-and-loop type fastening material (not shown), magnets 360 (FIG. 9), or another mechanical fastener, as is known in the art.

Alternately, the whip 20 may be coiled within a pocket of the purse 310 (FIG. 9) with the handle 10 fixed outside of the purse 310 with a mechanical fastener (not shown) such as a hook-and-loop type fastening material, one or two magnets, mechanical snaps, or the like. The whip 20 is deployed by grasping the handle 10 and pulling the whip 20 out of the purse 310.

The handle 10 preferably further includes a pivot locking mechanism 90 that includes a pin slot 100 formed at the barrel receiver 70 of the handle body 60. The pin slot 100 is adapted for slidably retaining a locking pin 110 therein, which is urged towards the pivotable barrel 50 by a spring 120 fixed within the pin slot 100. An actuator 130 is fixed with the locking pin 110 and projects through an actuator slot 140 formed in the handle body 60. The locking pin 110 normally projects through the barrel receiver 70 and into a locking aperture 150 formed in the pivotable barrel 50, unless the actuator 130 and the locking pin 110 are pulled away from the pivotable barrel 50 manually against the spring 120, which allows the whip 20 and the receiver 30 to pivot within the barrel receiver 50 of the handle body 60. As such, when the handle 10 is pulled away from the belt 200, as the whip 20 and the receiver 30 rotate to align the locking aperture 150 with the locking pin 110, the locking pin 110 snaps into place in the locking aperture 150 to rotationally fix the handle 10 with the whip 20. In an alternate embodiment, the whip 20 is crimped proximate the handle 10 to facilitate the handle 10 lying flat against the belt 200.

Figure 11:
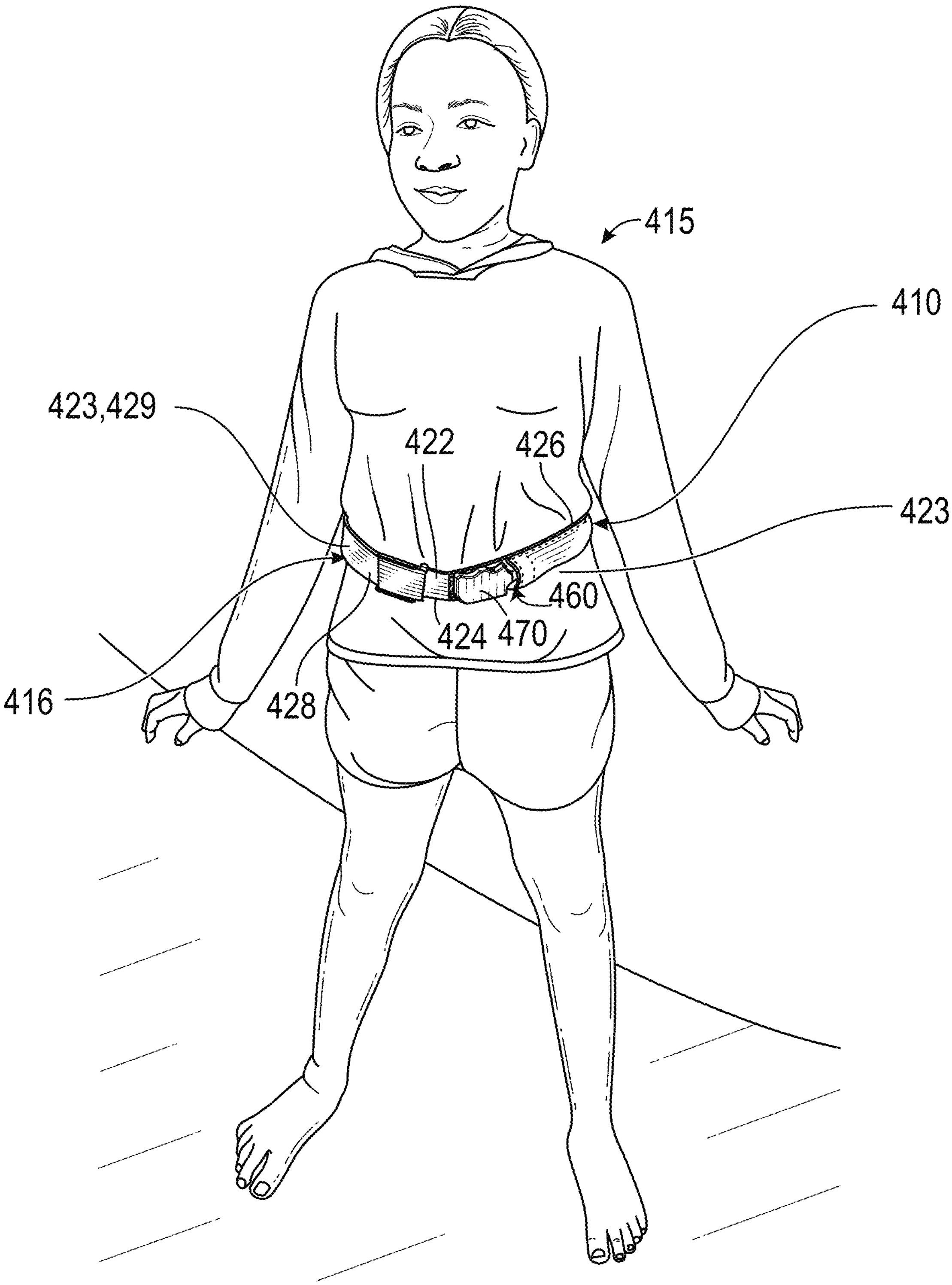
FIG. 11 illustrates the personal defense belt as worn by a person with a whip in a stowed position.

FIG. 11 illustrates an embodiment including a personal defense belt 410 for encircling a waist 416 of a person 415. The personal defense belt 410 is comprised of an elongated flexible web 423, which has an inside surface 421, an outside surface 429, a first end 422, a second end 428, a top edge 426, and a bottom edge 424. The flexible web 423 may be made of a woven nylon material, leather, or other suitable material for making belts, as is known in the art.

Figure 15:
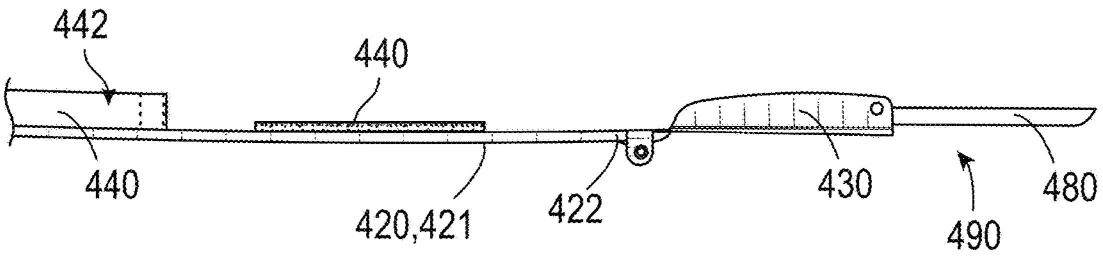
FIG. 15 is a partial side view of a proximal end of a flexible web and a flexible cover of the invention, illustrated with a buckle mechanism having a cam lock lever.
Figure 17:
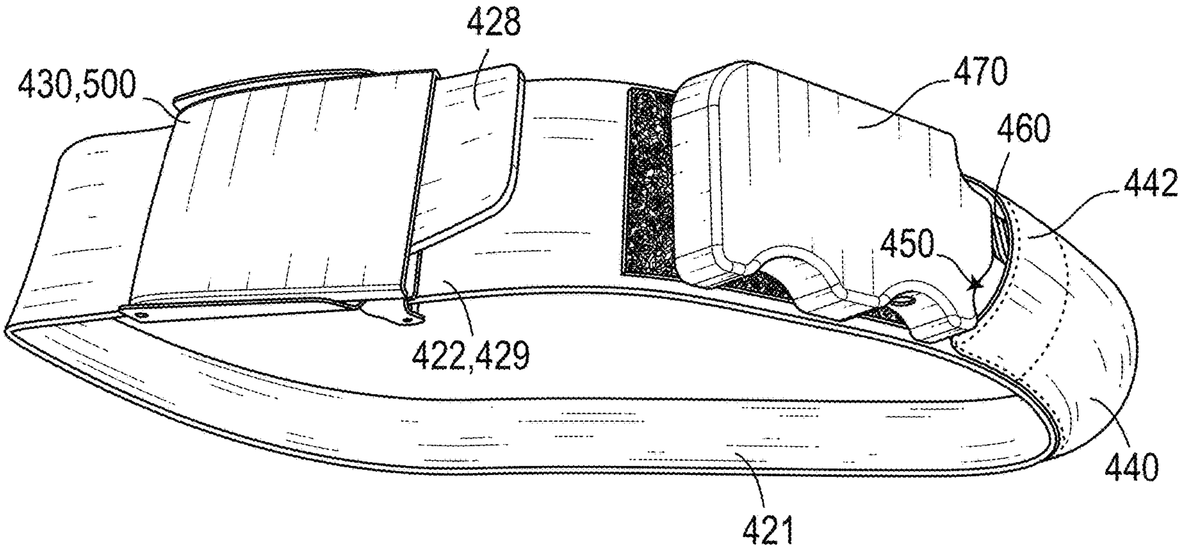
FIG. 17 is a perspective view of the invention with the buckle arrangement having the cam lock lever.

A buckle mechanism 430 is at least partially fixed with the first end 422 of the flexible web 423 and is adapted for selectively fixing the first end 422 of the flexible web 423 with the second end 428 of the flexible web 423 around the person's waist 416. The buckle mechanism 430 preferably includes a cam lock lever 480 that, when in an open position 490 (FIG. 15), allows the second end 428 of the flexible web 423 to be received therein up to a desired location along the flexible web 423. The cam lock lever 480 is then placed in a closed position 500 wherein the cam lock lever 480 binds the flexible web 423 in place with respect to the first end 422 of the flexible web 423 (FIG. 17). As such, the personal defense belt 410 may be selectively tightened around the waist 416 of the person 415 as desired.

Figure 19:
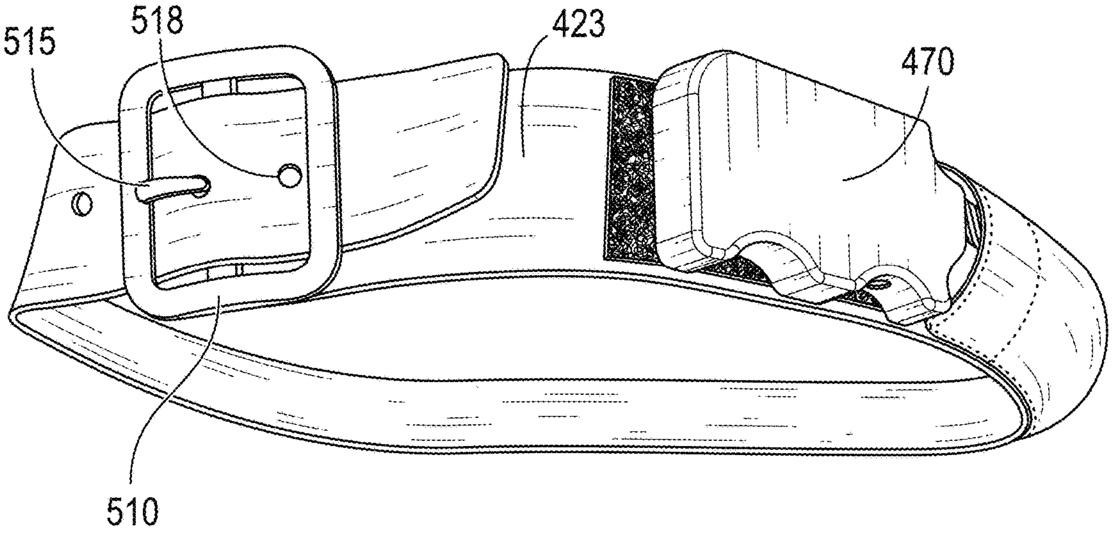
FIG. 19 is a perspective view of the invention with the buckle arrangement having a D-ring and prong.

Alternatively, the buckle mechanism 430 may include a D-ring 510 (FIG. 19) and a prong 515, such as with traditional belts. The D-ring 510 is adapted to receive the second end 428 of the flexible web 423 to a desired location along the flexible web 423, and the prong 515 traverses the flexible web 423 at one of a plurality of belt apertures 518 formed along the flexible web 423 proximate the second end 428 of the flexible web 423 so to fix the flexible web 423 in place with respect to the first end 422 of the flexible web 423.

Figure 18:
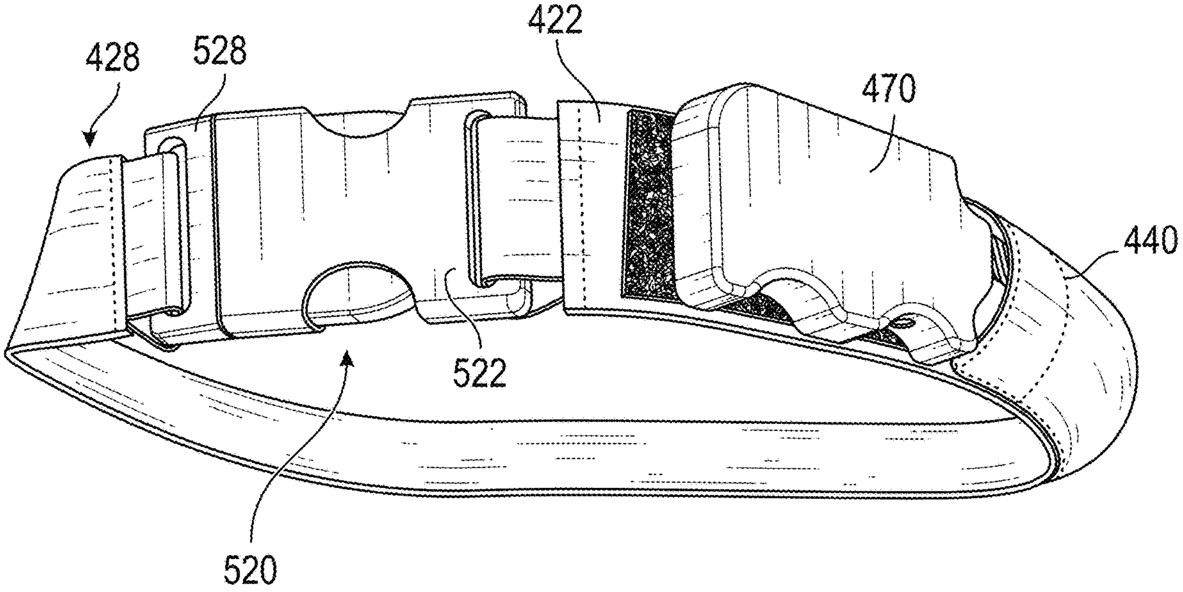
FIG. 18 is a perspective view of the invention with the buckle arrangement having two-part clip buckle.

In an alternate embodiment, the buckle mechanism 430 may include a first part 522 (FIGS. 16 and 18) of a two-part clip buckle 520 fixed with the first end 422 of the flexible web 423. A second part 528 of the two-part clip buckle 520 is selectively fixed along the flexible web 423 at a desired location proximate the second end 428 of the flexible web 423. Other such buckle mechanisms 430 may be utilized as is or becomes known in the art.

Figure 13:
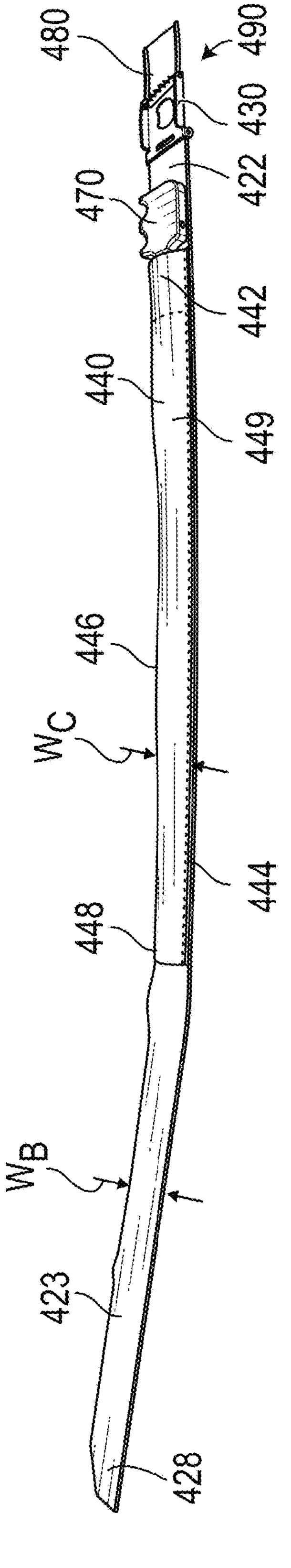
FIG. 13 is a perspective view of the personal defense belt in a flat configuration with the whip stowed.
Figure 14:
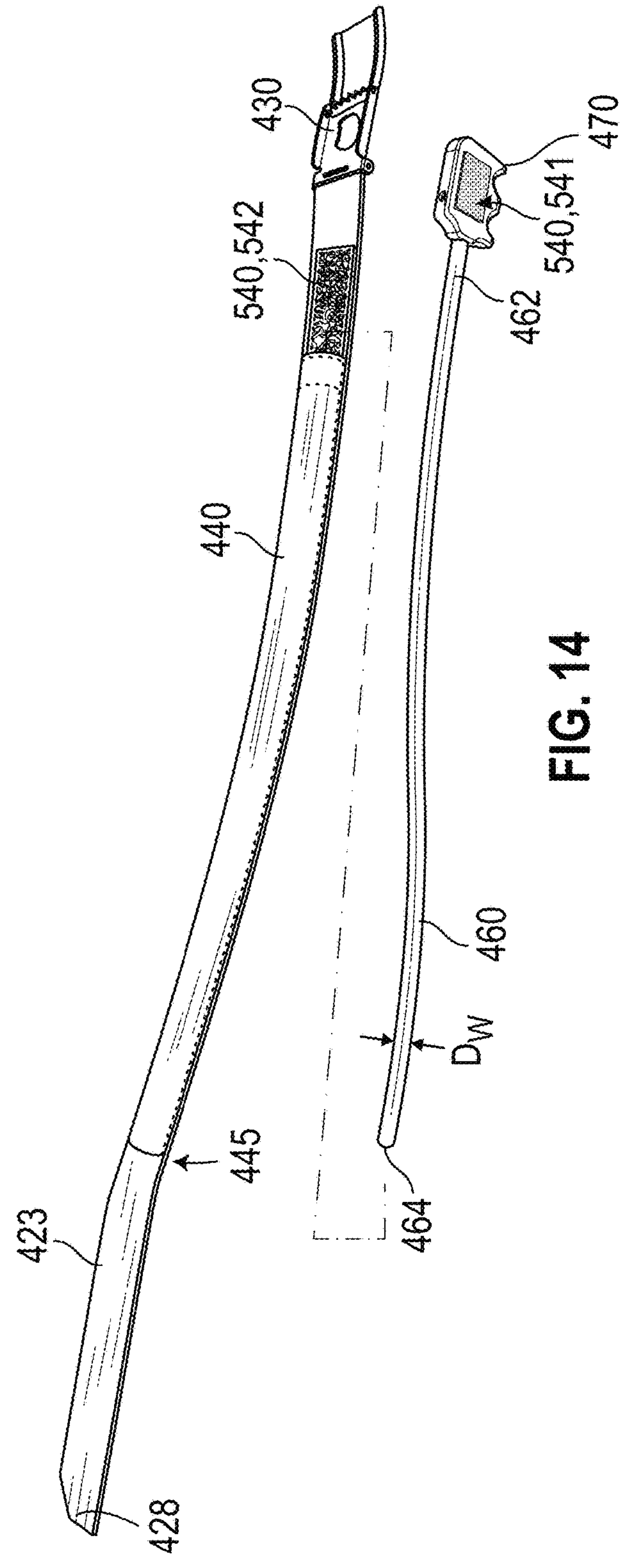
FIG. 14 is an exploded perspective view of FIG. 3, but with the whip removed from the whip storage space.
Figure 16:
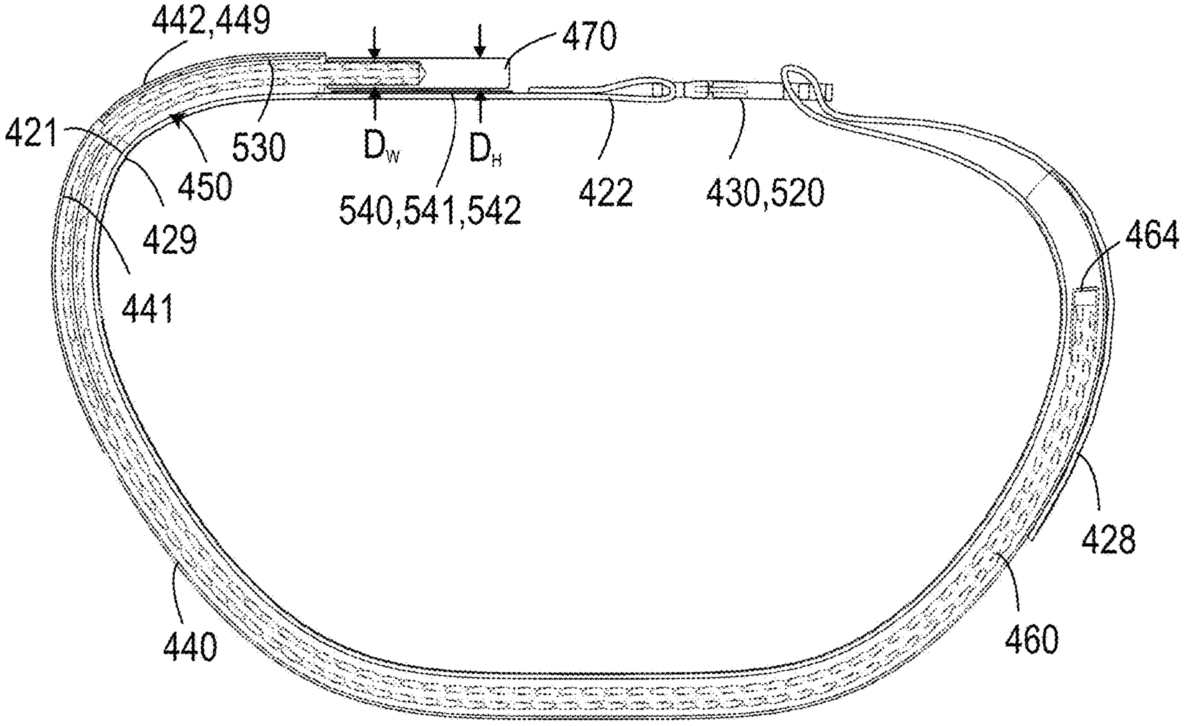
FIG. 16 is a cross-sectional view of the invention, illustrating an alternate buckle mechanism.

The personal defense belt 410 further includes an elongated flexible cover 440 fixed with the outside surface 429 of the flexible web 423 proximate the first end 422 and extending along the flexible web 423 to a terminating location 445 (FIG. 14). The flexible cover 440 includes an inside surface 441, an outside surface 449, a proximal end 442, a distal end 448, a top edge 446, and a bottom edge 444. A width $W_C$ (FIG. 13) of the flexible cover 440 from the top edge 446 thereof to the bottom edge 444 thereof is larger than a width $W_B$ of the flexible web 423 from the top edge 426 thereof to the bottom edge 424 thereof. As such, when the top edge 446 of the flexible cover 440 is fixed with the top edge 426 of the flexible web 423, and the bottom edge 444 of the flexible cover 440 is fixed with the bottom edge 424 of the flexible web 423, the flexible cover 440 bows to form a whip storage space 450 between the flexible cover 440 and the flexible web 423 (FIGS. 16 and 17).

In an alternate embodiment of the invention, the flexible cover 440 may be applied to the inside surface 421 of the flexible web 420, an aperture (not shown) through the flexible web 420 providing access to the whip storage space 450 between the flexible cover 440 and the flexible web 420. As such the flexible web 420 presents a relatively flat outside surface 429 to conceal the curved whip storage space 450.

Figure 12:
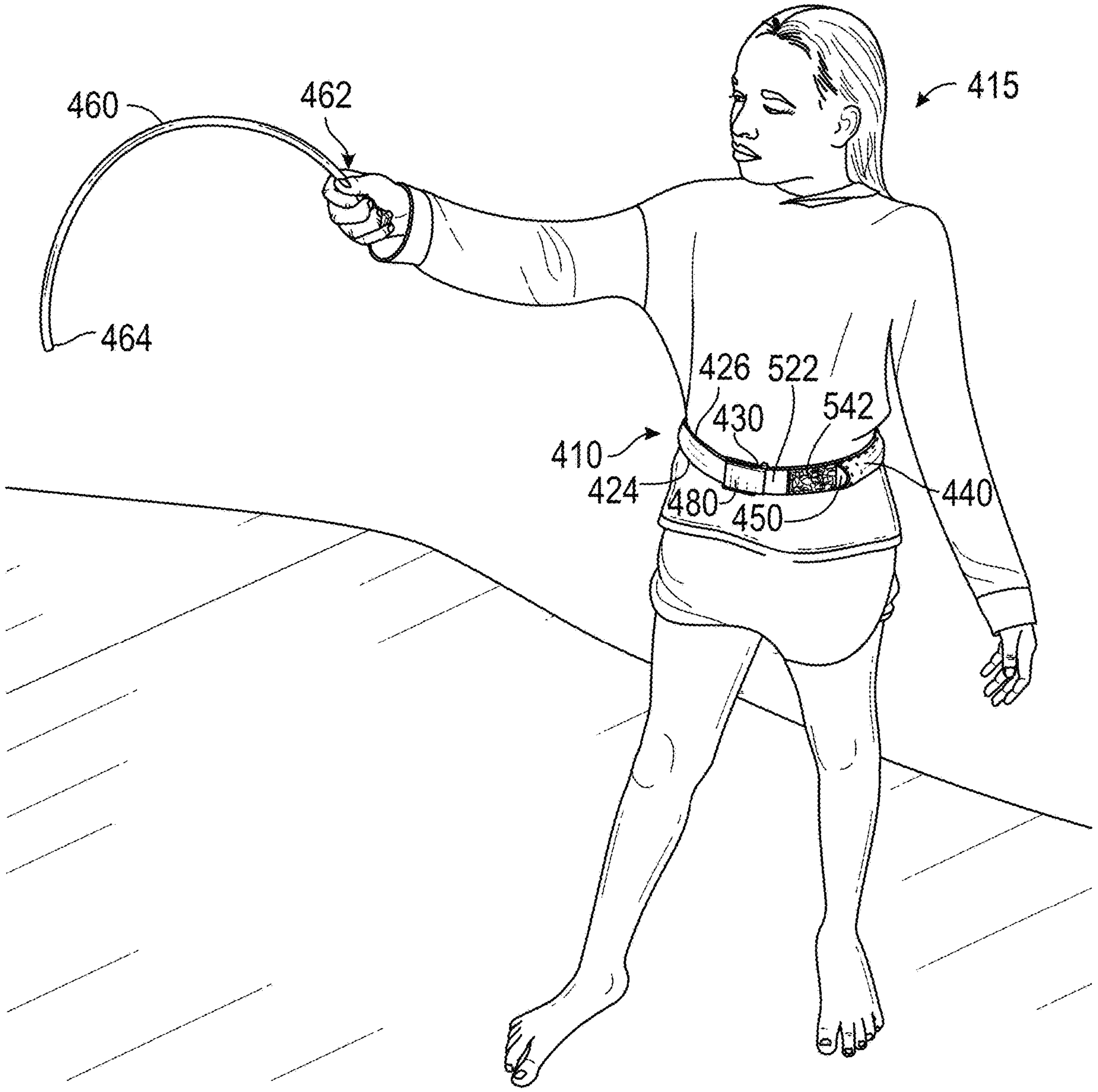
FIG. 12 illustrates the personal defense belt as worn by the person with the whip brandished.

The personal defense belt 410 further includes a whip 460, which has a proximal end 462 and a distal end 464, as well as a handle 470 fixed with the proximal end 462. Preferably the handle 470 is relatively flat so as to lie flat against the flexible web 420 unobtrusively. The flexible cover 440 is positioned away from the buckle mechanism 430 enough so that the handle 470 can be grasped without interference from the buckle mechanism 430. The whip 460 is selectively stowable in the whip storage space 450 (FIG. 11), whereby the person 415 may grasp the handle 470 of the whip 460 and pull the whip 460 from the whip storage space 450 so as to quickly brandish the whip 460 (FIG. 12). The whip 460 is preferably made of a metal cable, or other suitable, relatively heavy material capable of inflicting significant damage against an attacker. Preferably the metal cable is a flexible, braided steel material, coated with a plastic cover to aid in the removal of the whip 460 from the whip storage space 450.

Figure 20:
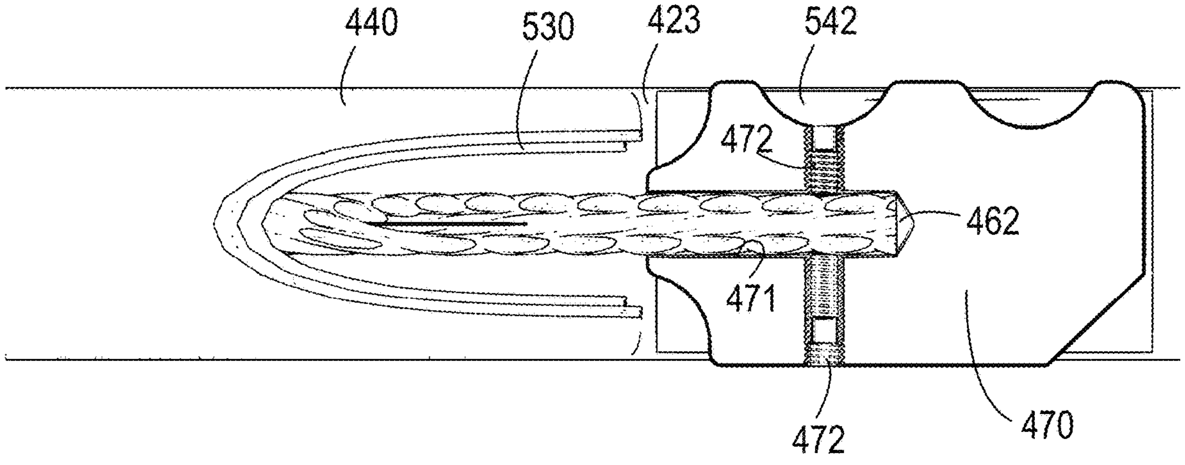
FIG. 20 is a partial top plan view of the invention, illustrated with a flexible cover and a low friction material partially broken away to show the whip in a stowed position.

The inside surface 441 of the proximal end 442 of the flexible cover 440, and optionally the outside surface 429 of the flexible web 423, preferably include a low-friction material (FIGS. 16 and 20), such as a Teflon® pad, fixed to the inside surface 441 of the flexible cover 440, to facilitate removal of the whip 460 from the whip storage space 450. Indeed, a substantial portion of the whip storage space 450 may be lined with such a low-friction material 530 to further facilitate removal of the whip 460 therefrom.

The handle 470 of the whip 460 may further include a hook side 541 of a hook-and-loop type fastening material 540, wherein the outside surface 429 of the flexible web 423 proximate the first end 422 includes a loop side 542 of the hook-and-loop type fastening material 540. As such, when the whip 460 is stowed in the whip storage space 450, the handle 470 is fixed with the outside surface 429 of the flexible web 423 at the hook-and-loop type fastening material 540. Alternately, the handle 470 of the whip 460 may further include a first half of a two-part fastening device (not shown), such as a snap or a clip, wherein the outside surface 429 of the flexible web 423 proximate the first end 422 includes a second half of a two-part fastening device (not shown).

The handle 470 may include a whip aperture 471 (FIG. 20) and at least one orthogonal threaded bore 472 intersecting the whip aperture 471, whereby a set screw threaded into the threaded bore 472 fixes the proximal end 462 of the whip 460 in the handle 470. In such an embodiment, the whip aperture 471 may be angled three to five-degrees within the handle with respect to a longitudinal axis of the handle to urge the handle 470 towards the flexible web 420 (not shown). Alternately, the proximal end 462 of the whip 460 may be fitted with screw threading (not shown), such that the proximal end 462 of the whip 460 is fixed to the handle 470 directly. The whip 460 may be applied to the handle 470 in other ways as is known in the art.

Preferably, the handle 470 has a depth DH (FIG. 16) less than 10% of a diameter $D_W$ of the whip 460, whereby the handle 470 lies substantially flat against the outside surface 429 of the flexible web 423. Further, the handle 470 may be molded to fit the shape of the hand of the person 415, but may alternately be cylindrical. Further, a thin layer of gripping material (not shown) may also be fixed to the handle 470 to facilitate the person 415 gripping the handle 470.

The whip storage space 450 is preferably open at the terminating location 445 of the flexible cover 440, whereby a whip 460 longer than the flexible cover 440 may be stored within the whip storage space 450, so that the proximal end 462 of the whip 460 is not covered by the flexible cover 440. In an alternate embodiment, belt loops (not shown) around the flexible web 420 function as the flexible cover 440 to keep the whip 460 from hanging down below the personal defense belt 410 and instead be inserted into the belt loops to keep the personal defense belt 410 stored against the flexible web 423. In such an embodiment, however, the whip 460 is not concealed when stowed in the whip storage space 450.

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A handle for a whip having a proximal end, comprising:

a receiver having an opening at a distal end thereof, the opening adapted for receiving the proximal end of the whip therein, the distal end of the receiver having a transverse threaded set screw aperture therethrough, a set screw adapted for being received in the threaded set screw aperture and for tightening against the proximal end of the whip to secure the whip in the receiver, the receiver further having a pivotable barrel 11 at a proximal end thereof, the pivotable barrel having a bore therethrough from a top end 12 thereof to a bottom end thereof; and a handle body having a barrel receiver formed in a distal end of the handle body, the barrel receiver adapted for receiving the pivotable barrel rotatably therein, a pivot pin adapted for fixing through the distal end of the handle and the bore of the pivotable barrel;

wherein with the proximal end of the whip fixed within the receiver, the handle body is configured to be manually manipulated to brandish the whip.

2. The handle of claim 1 further including a pivot locking mechanism that includes a pin slot formed at the barrel receiver and adapted for slidably retaining a locking pin therein, the locking pin urged towards the pivotable barrel by a spring fixed within the pin slot, an actuator fixed with the locking pin and projecting through an actuator slot formed in the handle body, the locking pin normally projecting through the barrel receiver and into a locking aperture formed in the pivotable barrel unless the actuator and the locking pin are pulled away from the pivotable barrel manually against the spring, thereby allowing the whip and receiver to pivot within the barrel receiver.

3. The handle of claim 1 wherein the handle body includes two or more ergonomic finger grooves to facilitate gripping of the handle body.

4. A whip device comprising:

an elongated whip having a distal end and a proximal end;

a receiver having an opening at a distal end thereof, the opening adapted for receiving the proximal end of the whip therein, the distal end of the receiver having a transverse threaded set screw aperture therethrough, a set screw adapted for being received in the threaded set screw aperture and for tightening against the proximal end of the whip to secure the whip in the receiver, the receiver further having a pivotable barrel at a proximal end thereof, the pivotable barrel having a bore therethrough from a top end thereof to a bottom end thereof; and a handle body having a barrel receiver formed in a distal end of the handle body, the barrel receiver adapted for receiving the pivotable barrel rotatably therein, a pivot pin adapted for fixing through the distal end of the handle and the bore of the pivotable barrel;

wherein with the proximal end of the whip fixed within the receiver, the handle body is configured to be manually manipulated to brandish the whip.

5. The whip device of claim 4 further including a pivot locking mechanism that includes a pin slot formed at the barrel receiver and adapted for slidably retaining a locking pin therein, the locking pin urged towards the pivotable barrel by a spring fixed within the pin slot, an actuator fixed with the locking pin and projecting through an actuator slot formed in the handle body, the locking pin normally projecting through the barrel receiver and into a locking aperture formed in the pivotable barrel unless the actuator and the locking pin are pulled away from the pivotable barrel manually against the spring, thereby allowing the whip and receiver to pivot within the barrel receiver.

6. The whip device of claim 4 wherein the handle body includes two or more ergonomic finger grooves to facilitate gripping of the handle body.

7. The whip device of claim 4 wherein the whip includes a braided steel cable having an elastomeric outer covering.

* * * * *